GEORGE TAYLOR.
Improvement in Rigging for Vessels.
No. 124,986. Patented March 26, 1872.
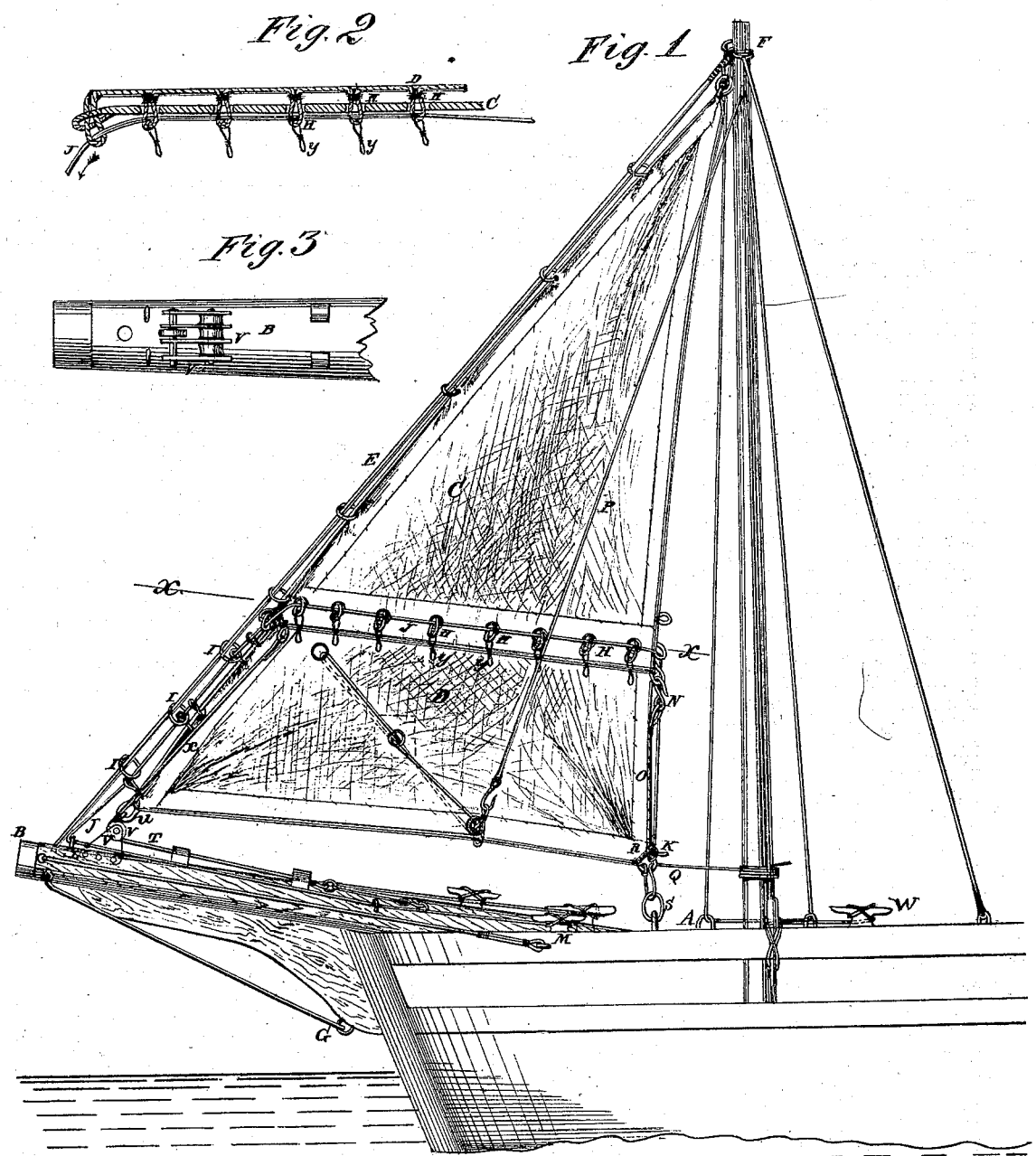

UNITED STATES PATENT OFFICE.

GEORGE TAYLOR, OF HARWICH, MASSACHUSETTS.

IMPROVEMENT IN RIGGING FOR VESSELS.

Specification forming part of Letters Patent No. 124,986, dated March 26, 1872.

Specification describing a new and useful Improvement in Rigging Sailing-Vessels, invented by Capt. GEORGE TAYLOR, of Harwich, in the county of Barnstable and State of Massachusetts.

The main object which I have in view in the present invention is to save life by rendering it unnecessary for sailors to go onto the bowsprit of the vessel in rough weather. On the great number of schooners which comprise the fishing squadron of the eastern coast, as well as on most sailing-vessels, the bowsprit is the point of danger to the sailors. Connected with the lower end of the jib is what is known as the "bonnet," which is, when in use, a prolongation of the jib. This bonnet reaches out over the bowsprit, and has to be furled or removed in rough and stormy weather. To do this the sailor must go out onto the bowsprit, which is almost always wet, and frequently covered with ice, and many a poor sailor, in the line of his duty, goes onto it who is never seen again.

The present invention consists in so attaching the bonnet to the jib and supporting it by the bowsprit as to render it unnecessary for the sailor to leave the deck in furling or removing it, as will be hereinafter more fully described.

In the accompanying drawing, Figure 1 is a side view of a vessel rigged according to my invention. Fig. 2 is a section of Fig. 1 taken on the line $x\,x$. Fig. 3 is a detail, giving a top view of a portion of the bowsprit.

Similar letters of reference indicate corresponding parts.

A represents the deck of the vessel. B is the bowsprit. C is the jib. D is the bonnet. The jib is supported by the line E, one end of which is attached to the top of the mast F, and the other, after passing down through the end of the bowsprit, is attached beneath the bowsprit, as seen at G. The bonnet is connected to the base of the jib by means of loops H attached to the upper edge of the bonnet, which pass through holes in the jib, as seen in Figs. 1 and 2. The forward end of the bonnet is also provided with loops, which pass through the rings I on the jib-stay E. J is a line, one end of which is secured at the point K at the inner lower corner of the bonnet. This line passes up and is rove through the loops H, which have been passed through the jib and through the rings I, from whence it passes down under the staple I in the bowsprit, and along on the bowsprit, and is fastened to the cleat M, as seen. Now, by releasing this fastening at M, the line J can be drawn through and from all the loops H, thus severing the connection of the bonnet with the jib, so far as this line is concerned. N is a hook in the leech-line O of the bonnet, which is attached to a loop in the leech-line of the jib. When this hook-connection is released the bonnet will drop from the jib and be supported by the spilling-line P. The bonnet is still connected with the deck by the line Q, which is attached at one end to the cringle R in the corner of the bonnet, and passed through the ring S and back through the cringle. The end is then fastened to the mast, or otherwise secured. When this line is detached the bonnet may be removed by loosening the line T, which is attached to the cringle U at the forward corner of the bonnet, by which line the bonnet is drawn or strained downward and forward. This line passes beneath one of the series of pulleys V on the top of the bowsprit, seen in Fig. 3, and extends back on the bowsprit, and is fastened to the cleat W on the deck. All these lines are detached and the bonnet entirely released in the space of two or three minutes, or in one-fourth the time it usually takes the sailor when he is compelled to go out onto the bowsprit to release the lines in the usual manner. By my arrangement this is all done without leaving the deck, thus avoiding all danger. The bonnet is replaced in fine weather, as it is only then that it is required. When the bonnet is removed the jib may be dropped down by hauling on the line $x$, which passes under one of the pulleys V. These pulleys are confined in the frame V', which is made fast to the bowsprit, as represented, the forward portion of which frame slopes toward the end of the bowsprit, so as to prevent a line from catching. The loops H, which have to be passed through the jib, are each provided with sub-loops $y$, made of small cord, for convenience in getting the loops H through the holes in the jib, as, when the loops are hard and stiff, it is very difficult to make the connection.

I do not limit or confine myself to the particular form or arrangement of the parts shown, as they may be varied without departing from my invention.

Having thus described my invention, I claim as new and desire to secure by Letters Patent—

The method of removing or furling the "bonnet" of a schooner or other vessel without the necessity of causing the sailor to go out on the bowsprit, by attaching the said bonnet, by loops H and line J, to the jib, and operating said line in the manner described.

The above specification of my invention signed by me this 27th day of November, A. D. 1871.

GEO. TAYLOR.

Witnesses:
   GEO. W. MABEE,
   T. B. MOSHER.